(12) United States Patent
Conraux

(10) Patent No.: US 7,573,368 B2
(45) Date of Patent: Aug. 11, 2009

(54) ELECTROMAGNETIC TRANSPONDER WITH NO AUTONOMOUS POWER SUPPLY

(75) Inventor: Jérôme Conraux, Trets (FR)

(73) Assignee: STMicroelectronics SA, Montrouge (FR)

( * ) Notice: Subject to any disclaimer, the term of this patent is extended or adjusted under 35 U.S.C. 154(b) by 533 days.

(21) Appl. No.: 11/312,790

(22) Filed: Dec. 20, 2005

(65) Prior Publication Data

US 2006/0132289 A1 Jun. 22, 2006

(30) Foreign Application Priority Data

Dec. 20, 2004 (FR) .................................. 04 53066

(51) Int. Cl.
| | |
|---|---|
| *H04Q 5/22* | (2006.01) |
| *G08B 13/14* | (2006.01) |
| *H04B 5/00* | (2006.01) |
| *H04B 7/00* | (2006.01) |
| *G06K 19/06* | (2006.01) |
| *G01S 13/00* | (2006.01) |

(52) U.S. Cl. ............... 340/10.3; 340/10.52; 340/572.1; 340/572.2; 340/572.3; 340/539.1; 455/41.1; 455/41.2; 235/492; 235/380; 342/62; 342/50; 342/51

(58) Field of Classification Search ..... 340/10.1–10.52, 340/539.1, 572.1–572.9; 455/558, 41.1, 455/73, 78, 41.2, 82, 83; 702/189; 428/166; 329/347

See application file for complete search history.

(56) References Cited

U.S. PATENT DOCUMENTS

| | | | | |
|---|---|---|---|---|
| 5,534,328 | A * | 7/1996 | Ashmead et al. | ............ 428/166 |
| 6,518,838 | B1 * | 2/2003 | Risbo | ........................... 330/10 |
| 6,784,785 | B1 * | 8/2004 | Wuidart et al. | ............. 340/10.1 |
| 6,792,288 | B1 * | 9/2004 | Billiot | ........................ 455/558 |
| 7,307,472 | B2 * | 12/2007 | Enguent et al. | ............. 329/347 |
| 7,308,249 | B2 * | 12/2007 | Rizzo et al. | .................. 455/411 |
| 7,400,874 | B2 * | 7/2008 | Moreaux et al. | ............ 455/334 |
| 2002/0198689 | A1 * | 12/2002 | Groiss | ........................ 702/189 |
| 2003/0189483 | A1 * | 10/2003 | Saitoh et al. | ............... 340/10.1 |
| 2005/0093682 | A1 * | 5/2005 | Enguent et al. | ........ 340/310.06 |
| 2006/0125553 | A1 * | 6/2006 | Enguent | ..................... 329/347 |

\* cited by examiner

*Primary Examiner*—Daniel Wu
*Assistant Examiner*—Fekadeselassie Girma
(74) *Attorney, Agent, or Firm*—Lisa K. Jorgenson; E. Russell Tarleton; Seed IP Law Group PLLC

(57) ABSTRACT

An electromagnetic transponder comprising: an oscillating circuit; a first rectifying bridge having its A.C. input terminals connected across the oscillating circuit and having its rectified output terminals connected at least to a voltage regulator in charge of providing a supply voltage; and a second rectifying bridge, of dimension smaller than that of the first bridge, having its two A.C. input terminals connected across the oscillating circuit and having at least one output terminal connected to a demodulator of data sensed by the oscillating circuit.

24 Claims, 1 Drawing Sheet

ELECTROMAGNETIC TRANSPONDER WITH NO AUTONOMOUS POWER SUPPLY

BACKGROUND OF THE INVENTION

1. Field of the Invention

The present invention generally relates to electromagnetic transponders and, more specifically, an electromagnetic transponder with no autonomous power supply.

The present invention applies for example to smart cards or electronic tags communicating without any contact with a terminal and extracting the power necessary for the supply of the circuits that they comprise from the high-frequency electromagnetic field radiated by the terminal. The present invention especially applies to electronic tags or smart cards in applications of electronic passport type.

2. Description of the Related Art

Systems for electromagnetic transponders are based on the cooperation between an oscillating circuit on the read-write terminal side and a resonant circuit on the electromagnetic transponder side (generally, a portable element), to exchange information by using a high-frequency field radiated by the oscillating circuit of the terminal. In the transponders to which the present invention applies, the high-frequency carrier is also used as a remote-supply carrier providing the transponder supply power.

An example of application of the present invention relates to transponder systems based on standards ISO 14443 and 15693 according to which the remote-supply carrier radiated by the terminal is 13.56 MHz, while a back-modulation sub-carrier may be used by the transponders to transmit information to the terminal with a 847.5-kHz frequency. In the terminal-to-transponder transponder direction, the carrier is modulated in amplitude with a modulation factor generally on the order of 10%. The modulation factor defines as being the amplitude difference between the transmission of a state 1 and the transmission of a state 0, divided by the sum of these amplitudes. In fact, standards set a range of acceptable modulation factors that transponders are supposed to be able to interpret and that terminals are supposed to respect. This range, in the case of the above-mentioned standards, ranges between 8 and 14%.

FIG. 1 very schematically shows in the form of blocks an example of an electromagnetic transponder system to which the present invention applies. A transponder 1 (TR) is intended to be placed in the electromagnetic field of a terminal 2 (TERM) having an inductive element L2 of an oscillating circuit emitting a high-frequency radiation sensed by an antenna L1 of transponder 1.

FIG. 2 very schematically shows in the form of blocks an example of a conventional architecture of an electromagnetic transponder 1. The transponder comprises an oscillating circuit 10, formed of an inductive element L1 forming an antenna, in parallel with a capacitor Cl at the A.C. input terminals of a rectifying bridge 11. The rectified output terminals of bridge 11 are connected by a storage capacitor Cs. The signal sensed when transponder 1 is in the field of a terminal is used upstream and downstream of rectifying bridge 11.

Downstream, the rectified voltage recovered at the output of bridge 11 is especially used by a regulator 12 (REG) to extract a D.C. supply voltage Vdd of the transponder circuits. The output of bridge 11 is also connected to the input of a circuit 13 (DEM) for demodulating the received data, generally, an amplitude demodulator. Finally, a modulator 14 (MOD) of the information to be transmitted to the terminal by back modulation connects a microprocessor 15 (μP) or any other circuit of control and of digital interpretation of the transmissions, to a back-modulation stage connected to the output of bridge 11. For simplification, the back-modulation stage has been assumed to be integrated to block 14.

Upstream of rectifying bridge 11, the high-frequency signal is sampled toward, especially, a circuit 20 (CLK GEN) of generation of a clock from the high-frequency carrier and a circuit 21 (RF DET) of detection of the presence of a radio-frequency excitation across resonant circuit 10.

A disadvantage of conventional transponders is that supply voltage Vdd provided by regulator 12 is contaminated by noise due to the switchings performed downstream (especially by the microprocessor). This noise is propagated to the input of regulator 12 on the rectified signal of bridge 11, which adversely affects the signal-to-noise ratio of the system and thus makes the data extraction by demodulator 13 more difficult.

This problem is all the more present as the modulation factor is low. Now, a low modulation factor (typically, less than 20%) is further required to provide a sufficient remote-supply power. Indeed, an amplitude modulation transmission in all or nothing would divide approximately by two the remote-supply capacity.

SUMMARY OF THE INVENTION

An embodiment of the present invention aims at overcoming all or part of the disadvantages of known transponder systems, in particular of transponders intended to receive amplitude-modulated data with a modulation factor smaller than one.

An embodiment of the present invention especially aims at improving the signal-to-noise ratio at the input of an amplitude demodulator of an electromagnetic transponder.

An embodiment of the present invention also aims at providing a solution which requires no modification of the terminal of the electromagnetic transponder system.

To achieve all or part of these aims, as well as others, one embodiment of the present invention provides an electromagnetic transponder comprising:

an oscillating circuit;

a first rectifying bridge having its A.C. input terminals connected across the oscillating circuit and having its rectified output terminals connected at least to a voltage regulator in charge of providing a supply voltage; and a second rectifying bridge, of dimension smaller than that of the first bridge, having its two A.C. input terminals connected across the oscillating circuit and having at least one output terminal connected to a demodulator of data sensed by the oscillating circuit.

According to an embodiment of the present invention, the surface area ratios of the first and second rectifying bridges to the total surface area taken up by the bridges formed in integrated form range between 80-20 and 98-2, such as between 93-7 and 97-3.

According to an embodiment of the present invention, a bandpass filter is interposed between the second rectifying bridge and the demodulator.

According to an embodiment of the present invention, a low-pass filter is interposed between the first rectifying bridge and the voltage regulator.

According to an embodiment of the present invention, reference terminals of the rectified outputs of the bridges are isolated from each other or connected by a resistive element.

The foregoing and other features of the present invention will be discussed in detail in the following non-limiting description of specific embodiments in connection with the accompanying drawings.

DETAILED DESCRIPTION

Figure 1:
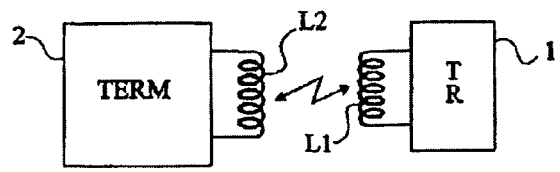
FIG. 1, previously described, very schematically shows in the form of blocks an example of an electromagnetic transponder system of the type to which one embodiment of the present invention applies.
Figure 2:
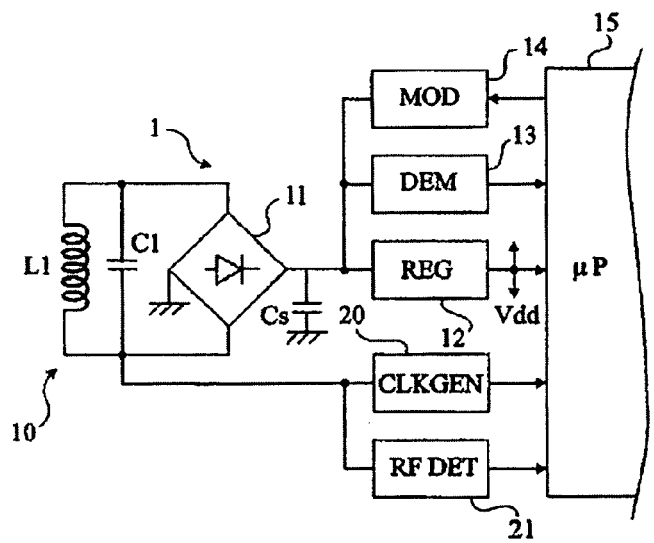
FIG. 2, previously described, very schematically shows in the form of blocks an example of a conventional architecture of an electromagnetic transponder.

Embodiments of an electromagnetic transponder with no autonomous power supply are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Same elements have been designated with same reference numerals in the different drawings. For clarity, only those elements necessary to the understanding of embodiments of the present invention have been shown and will be described hereafter. In particular, the respective structures of the different transponder elements have only been detailed when they are not conventional structures. Further, the structures of the digital circuits (microprocessors or circuits in wired logic) of interpretation of the transmitted data have not been detailed, one embodiments of the present invention being compatible with conventional circuits.

Figure 3:
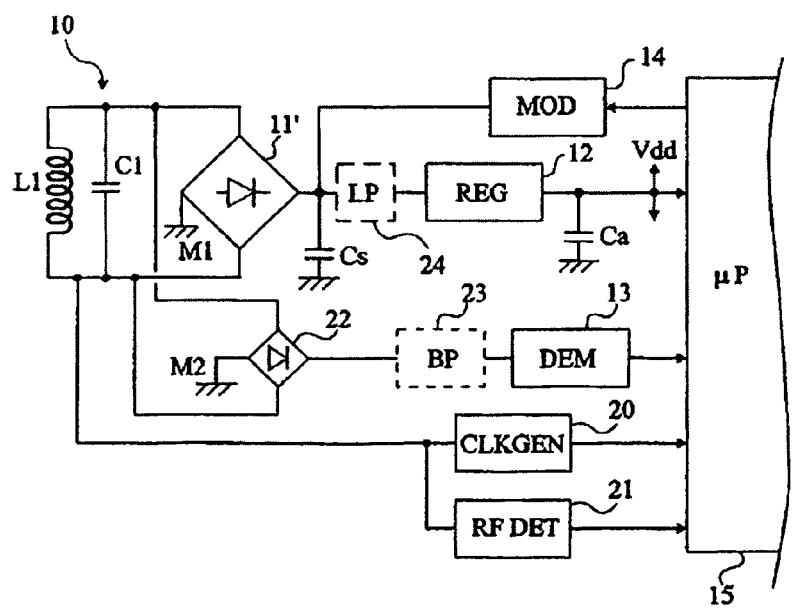
FIG. 3 very schematically shows in the form of blocks an embodiment of an electromagnetic transponder according to the present invention.

FIG. 3 very schematically shows in the form of blocks an embodiment of an electromagnetic transponder according to the present invention.

As previously, the transponder comprises an oscillating circuit 10 formed of an inductance L1 forming an antenna in parallel with a capacitor C1 to sense the electromagnetic field of a read/write terminal. As previously still, the transponder comprises a digital unit 15 (for example, a microprocessor µP) of control and interpretation of transmissions as well as, directly connected to the oscillating circuit, a clock generation circuit 20 (CLK GEN) and a radio-frequency excitation detection circuit 21 (RF DET) having its respective outputs sent onto microprocessor 15.

A feature of the present invention is to provide two rectifying bridges 11' and 22 having their respective A.C. inputs connected to terminals of oscillating circuit 10. Bridge 11' is of greater capacity than bridge 22. The respective dimensions of bridges 11' and 22 are a function of the current needs of the downstream circuits which are connected thereto.

Bridge 22 of reduced size is only intended for a demodulator 13 (DEM) of structure conventional per se, which is connected to the rectified output of bridge 22 and which provides the demodulated data to microprocessor 15.

Bridge 11' is at least intended to provide the power necessary to a regulator 12 (REG) of structure conventional per se so that it generates supply voltage Vdd of the transponder circuits. As previously, a capacitor Cs connects the rectified outputs of bridge 11' and voltage Vdd is provided across a capacitor Ca at the output of regulator 12.

The fact of dedicating a rectifying bridge 22 to demodulator 13 enable isolating the signal to be demodulated from the switching noise downstream of bridge 11'. Indeed, such noise does not pass into the reverse rectifying elements and is thus not present on the side of oscillating circuit 10. The signal-to-noise ratio at the input of demodulator 13 is thus improved.

An embodiment of the present invention takes advantage from the fact that the current needs of the amplitude demodulator are very low as compared to the current needs of the transponder. Typically, the demodulator (which interprets a voltage signal) needs a few tens of microamperes, while the transponder supply requires up to 100 milliamperes, or even more. The needs thus are by a ratio of 1 to 1,000, or even of 1 to 10,000. The surface area ratios of bridges 11' and 22 to the total surface taken up by the bridges made in the integrated form range between 80-20 and 98-2. For example, bridge 22 amounts to between 3 and 7% of the total surface area taken up by the bridges (ratios between 97-3 and 93-7).

According to the type of technology used to integrate the circuit (especially the use or not of separate wells), reference terminals M1 and M2 of bridges 11' and 22 may be isolated from each other or be connected by a resistor, to avoid feedback of switching noise through the ground.

The fact for circuits 20 and 21 to be directly connected to oscillating circuit 10 is not disturbing. Indeed, the switching noise is sent back by the supply voltages and, since these circuits are supplied by voltage Vdd, the noise rises up to regulator 12, then are blocked by bridge 11'.

A modulator 14 (MOD) of conventional structure performing the back modulation of the data to be transmitted to the transponder is connected on bridge 11' rather than on bridge 22 to, here again, avoid polluting the demodulator.

According to a variation illustrated in dotted lines, a band-pass filter 23 (BP) is interposed between the output of bridge 22 and the input of demodulator 13, to only let through the frequency band of the data signal expected by the demodulator.

According to another variation illustrated in dotted lines, a low-pass filter 24 (LP) is interposed upstream of voltage regulator 12, to filter the high-frequency noise generated by the circuit on the supply voltage.

Of course, the present invention is likely to have various alterations, modifications, and improvements which will readily occur to those skilled in the art. In particular, the practical implementation of the present invention based on the functional indications given hereabove is within the abilities of those skilled in the art. Further, other circuits may be connected downstream of bridge 11' according to applications, provided that bridge 22 is dedicated to demodulator 13 and that the supply of the possible circuits connected upstream of bridges 11' and 22 originates from bridge 11'.

Such alterations, modifications, and improvements are intended to be part of this disclosure, and are intended to be within the spirit and the scope of the present invention.

Accordingly, the foregoing description is by way of example only and is not intended to be limiting. The present invention is limited only as defined in the following claims and the equivalents thereto.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. An electromagnetic transponder, comprising:
    an oscillating circuit that includes an antenna;
    a first rectifying bridge having its A.C. input terminals connected across the oscillating circuit and having its rectified output terminals connected at least to a voltage regulator in charge of providing a supply voltage and further connected to a modulator; and
    a second rectifying bridge, of dimension smaller than that of the first bridge, having its two A.C. input terminals connected across the oscillating circuit and having at least one output terminal connected to a demodulator of data sensed by the oscillating circuit.

2. The transponder of claim 1, wherein the surface area ratios of the first and second rectifying bridges to the total surface area taken up by the bridges formed in integrated form range between 80-20 and 98-2, preferably between 93-7 and 97-3.

3. The transponder of claim 1, wherein a bandpass filter is interposed between the second rectifying bridge and the demodulator.

4. The transponder of claim 1, wherein a low-pass filter is interposed between the first rectifying bridge and the voltage regulator.

5. The transponder of claim 1, wherein reference terminals of the rectified outputs of the bridges are isolated from each other or connected by a resistive element.

6. A method of supplying power to a transponder, comprising:
    receiving a wireless signal at the transponder;
    rectifying a received signal at a first rectifier to obtain a first rectified signal that is output to a regulator and receiving a modulated output signal from a modulator on an output terminal of the first rectifier;
    rectifying the received signal to obtain a second rectified signal;
    regulating the first rectified signal; and
    demodulating the second rectified signal.

7. The method of claim 6, further comprising:
    powering a processor with the regulated signal;
    processing the demodulated signal with the processor; and
    modulating the processed signal.

8. The method of claim 6, further comprising filtering the first rectified signal before the first rectified signal is regulated.

9. The method of claim 6, further comprising filtering the second rectified signal before the second rectified signal is demodulated.

10. A system for powering a transponder, comprising:
    a means for receiving a wireless signal at the transponder;
    a first means for rectifying the received signal as a first rectified signal that is input to at least a regulator and to receive a modulator output on an output of the first means for rectifying;
    a second means for rectifying the received signal as a second rectified signal;
    a means for demodulating the second rectified signal as a demodulated signal; and
    a means for processing the demodulated signal.

11. The system of claim 10, wherein the first means for rectifying has a greater current capacity than the second means for rectifying.

12. The system of claim 10, wherein the first means for rectifying has a greater surface area than the second means for rectifying.

13. The system of claim 10, wherein the means for processing is arranged to provide a processed signal to a means for modulating the modulator.

14. The system of claim 10, further comprising a means for filtering the first rectified signal and a means for filtering the second rectified signal.

15. A system for wireless communication, comprising:
    a terminal that includes an antenna to transmit a wireless signal; and
    a transponder electro-magnetically coupled to the terminal, the transponder including:
    a first rectifying bridge having at least one input terminal coupled to an oscillating circuit and having an output terminal coupled to a voltage regulator that is arranged to provide a supply voltage and further coupled to the output of a modulator; and
    a second rectifying bridge having at least one input terminal coupled to the oscillating circuit and having an output terminal coupled to a demodulator.

16. The system of claim 15, wherein the transponder further comprises a filter coupled between the first rectifying bridge and the regulator.

17. The system of claim 16, wherein the transponder further comprises a filter coupled between the second rectifying bridge and the demodulator.

18. The system of claim 15, wherein the modulator is coupled to a processing unit.

19. The system of claim 18, wherein the processing unit is arranged to receive a demodulated signal from the demodulator and to output a signal to the modulator.

20. The system of claim 15, wherein the first rectifying bridge has a greater current capacity than the second rectifying bridge.

21. The system of claim 15, wherein the first rectifying bridge has a greater surface area than the second rectifying bridge.

22. A transponder apparatus, comprising:
    an oscillating circuit that includes an antenna coupled to at least one input terminal of a first rectifying unit and at least one input terminal of a second rectifying unit that has a smaller current capacity than the first rectifying unit;
    a first filter coupled to an output terminal of the first rectifying unit and a input terminal of a voltage regulator arranged to provide a supply voltage;
    a second filter coupled to an output terminal of the second rectifying unit and coupled to an input terminal of a demodulator that has an output coupled to a processing unit;
    and a modulator that has at least one input terminal coupled the processing unit and an output terminal coupled to an output terminal of the first rectifying unit.

23. The apparatus of claim 22, wherein the first rectifying unit has a greater surface area than the second rectifying unit.

24. The apparatus of claim 22, wherein the first rectifying unit comprises a bridge rectifier and the second rectifying unit comprises a bridge rectifier.

* * * * *

UNITED STATES PATENT AND TRADEMARK OFFICE
CERTIFICATE OF CORRECTION

PATENT NO. : 7,573,368 B2  Page 1 of 1
APPLICATION NO. : 11/312790
DATED : August 11, 2009
INVENTOR(S) : Jérôme Conraux It is certified that error appears in the above-identified patent and that said Letters Patent is hereby corrected as shown below:

Column 6,
Lines 8-9, "processed signal to a means for modulating the modulator." should read as
--processed signal to the modulator.--.

Signed and Sealed this

Twenty-third Day of February, 2010

David J. Kappos
*Director of the United States Patent and Trademark Office*